United States Patent Office 2,716,131
Patented Aug. 23, 1955

2,716,131

PROCESS FOR MANUFACTURING ALKYLNITRILE-2-ACETOXY

Karl Meinel, Burghausen, Upper Bavaria, Germany, assignor to Wacker-Chemie G. m. b. H., a corporation No Drawing. Application January 21, 1953,
Serial No. 332,543

Claims priority, application Germany March 7, 1952

5 Claims. (Cl. 260—465.4)

This invention relates to the preparation of alkylnitrile-2-acetoxy, and it has for its object to provide a novel and improved process for this purpose.

Another object of the invention is to provide a simple and efficient process of the above type which effects a much more complete conversion of the reaction materials than has heretofore been possible.

Still another object is to prepare alkylnitrile-2-acetoxy from alkali cyanides and alkylidene diacetates without necessitating the use of pure starting materials.

Various other objects and advantages will be apparent as the nature of the invention is more fully disclosed.

It is known to produce propanenitrile-2-acetoxy from a mixture of ethylidene diacetate and potassium cyanide at 140-150° C., but this is possible only with unsatisfactory conversions and yields.

I have now discovered a simple and efficient process which makes possible a complete transformation and which lends itself to general application. The process for the production of alkylnitrile-2-acetoxy from alkali cyanide and alkylidene diacetate consists substantially in performing the reaction in the presence of water, preferably in considerable quantities, and at a temperature of 0-30° C. The conversion occurs for the most part automatically and without heating; whereupon the mixture heats up to about 90° C., although according to the type of the initial compounds temperatures of 20° C. or less are favorable. Both components may be permitted to react, for example in the presence of 0.2-5 fold quantity of water, with reference to the alkylidene acetate. In order to better control the temperature, and if necessary cooling may also be required, one of the components is preferably added gradually to the other. For example, a 30% aqueous solution of sodium cyanide is mixed gradually with the ethylidene diacetate.

No particular stress is laid upon the purity of the cyanide. It is possible, for example, to start out with aqueous solutions of cyanide as obtained from lixiviation of fats from calcium cyanamide and common salt. The solutions contain, besides impurities in the form of chlorides of calcium and sodium, also carbon, calcium hydroxide, sulfide, etc. which originate from the calcium carbide used for the manufacture of calcium cyanide. Precisely for this reason the process of the present invention offers particular advantages, because considerable difficulty is experienced in obtaining pure hydrocyanic acid free from hydrogen sulfide and the like from such solutions, as they are required according to other processes for producing nitriles.

The preparation of the conversion mixture is preferably done in such a way that the nitrile is extracted with solvents, e. g., ethyl acetate. A possible still remaining residue of the nitrile after acidification is simultaneously extracted with acetic acid. It is also possible to acidify the conversion mixture and to extract the entire nitrile as well as the acetic acid with a solvent. It is also possible, if necessary, to add a part of the solvent to the conversion mixture at the beginning, in which case the conversion occurs more slowly. The acetic acid produced may be used according to known processes by conversion with vinyl acetate or acetylene, if necessary after changing into acetic acid anhydride through conversion with an aldehyde.

*Example 1*

To 130 parts of ethylidene diacetate, a solution of 57 parts of sodium cyanide in 122 parts of water is slowly added under vigorous stirring at about 25° C. After adding about a one-third portion the temperature is permitted to rise freely. It reaches of its own accord 85-90° C. in about ½ to ¾ of an hour. In order to complete the conversion stirring is continued for another few hours with falling temperature. Thereupon 120 parts of 50% sulfuric acid are carefully dripped in, after which water is added. The propanenitrile-2-acetoxy and the acetic acid are extracted from the solution obtained, for example with acetic acid ethylester. The extract is decomposed by means of fractional distillation. The nitrogen content of the reaction product amounts to 12.65%. (The theoretical value for the pure nitrile is 12.38.)

*Example 2*

A solution of 1.3 mol of sodium cyanide is dripped into 1 mol of ethylidene diacetate in 5.8 mol water (32% solution). The inflow is so regulated as to maintain the temperature between 10-30° C. After completing the addition of the sodium cyanide solution stirring is continued for several hours at the conversion temperature. The addition of 1.4 mol 50% sulfuric acid is done in such a way that the temperature here also remains between 10 and 30° C. The finishing operation is the same as in Example 1. The nitrogen content of the reaction product amounts to 12.61%.

*Example 3*

To 1 mol of ethylidene diacetate there is added dropwise a solution of 1.6 mol of potassium cyanide in 6.3 parts of water. Upon completion of the conversion 1.1 mol of 50% sulfuric acid is added. The operation from this point on is the same as in Example 2.

*Example 4*

A batch of calcium cyanamide and sodium chloride is first diluted with water. The resulting solution, the cyanide content of which, figured according to NaCN, amounts to 10-30%, is permitted to flow slowly into ethylidene diacetate. The proportion of cyanide to diacetate is preferably greater than 1, for example 1.3. The resulting temperature increase is kept within determined limits through cooling, e. g. between +10 and +15° C. or +20 and +25° C. After the conversion is completed, stirring is continued for several more hours at the reaction temperature. Thereupon 1.25 mol of 50% sulfuric acid is added, without permitting any substantial rise in the temperature. There is now a separation from the dissociated precipitate, which consists mainly of gypsum. The liquid is extracted, e. g. with acetic acid ethyl ester, and the precipitate is treated with the same extraction fluid. The combined extracts are separated by fractionation into acetic acid ethyl ester, acetic acid and propanenitrile-2-acetoxy.

*Example 5*

1 mol of butylidene diacetate is converted with 1.2-1.6 mol sodium cyanide in 6 mol of water. The other conditions are the same as in Example 2.

Although certain specific examples are given herein for purposes of illustration, it will be evident to those skilled in the art that the invention is capable of various

The invention claimed is:

1. Process for producing alkylnitrile-2-acetoxy which comprises reacting an alkali cyanide with an alkylidene diacetate in the presence of water at a temperature of 0–30° C.

2. Process for producing alkylnitrile-2-acetoxy which comprises reacting an alkali cyanide with an alkylidene diacetate in the presence of water at a temperature which is maintained at 0–30° C. at least until the reaction is well under way.

3. Process according to claim 1, in which the quantity of water employed is at least 0.2 to 5 times the quantity of alklidene diacetate.

4. Process according to claim 1, which is initiated with aqueous dispersions of calcium cyanamide and alkali chloride.

5. Process for producing alkylnitrile-2-acetoxy which comprises reacting sodium cyanide with ethylidene diacetate in the presence of water at an initial reaction temperature of 0–30° C.

References Cited in the file of this patent

UNITED STATES PATENTS

| | | |
|---|---|---|
| 2,383,137 | Lecher et al. | Aug. 21, 1945 |
| 2,483,853 | Smith et al. | Oct. 4, 1949 |

OTHER REFERENCES

Mowry, Chem. Reviews, vol. 42, pgs. 244, 246 (1948).